(12) United States Patent
Chao et al.

(10) Patent No.: US 10,974,787 B2
(45) Date of Patent: Apr. 13, 2021

(54) BRAKE LEVER AND BICYCLE USING THE SAME

(71) Applicant: ROYALBABY CYCLE BEIJING CO., LTD., Beijing (CN)

(72) Inventors: Zhiwei Chao, Beijing (CN); Yixiong Wang, Beijing (CN)

(73) Assignee: ROYALBABY CYCLE BEIJING CO., LTD., Beijing (CN)

( * ) Notice: Subject to any disclaimer, the term of this patent is extended or adjusted under 35 U.S.C. 154(b) by 0 days.

(21) Appl. No.: 17/038,077

(22) Filed: Sep. 30, 2020

(65) Prior Publication Data

US 2021/0061406 A1 Mar. 4, 2021

Related U.S. Application Data

(63) Continuation of application No. PCT/CN2020/108959, filed on Aug. 13, 2020.

(30) Foreign Application Priority Data

Aug. 27, 2019 (CN) .......................... 201910796571.3

(51) Int. Cl.
*B60L 3/02* (2006.01)
*B62L 3/02* (2006.01)

(52) U.S. Cl.
CPC ...................... *B62L 3/02* (2013.01)

(58) Field of Classification Search
CPC .......... B62L 3/02; B60T 11/046; B60T 7/102; B62K 23/06; F16D 2125/60; G05G 1/04; B60K 9/00
See application file for complete search history.

(56) References Cited

U.S. PATENT DOCUMENTS

| 2,638,175 | A | * | 5/1953 | Poulsen | B62L 3/02 180/219 |
| 2,924,115 | A | * | 2/1960 | Hood | B62K 23/06 74/489 |
| 5,287,765 | A | * | 2/1994 | Scura | B62K 23/06 74/489 |
| 6,263,754 | B1 | * | 7/2001 | Wesling | B62K 23/06 74/489 |

(Continued)

FOREIGN PATENT DOCUMENTS

| CN | 202609008 U | | 12/2012 |
| FR | 960276 | * | 4/1950 |

(Continued)

*Primary Examiner* — Vinh Luong

(57) ABSTRACT

A brake lever, including a protective casing, a fixing assembly cooperatively fixing the protective casing, a connecting member for connecting a hand brake cable, and a hand brake assembly; the hand brake assembly includes a main arm with one end rotatably connected to the protective casing, and the other end rotatably connected to a handle; the main arm is driven to rotate by applying a force to the handle, the connecting member is driven by a transmission member to move in the direction of tightening the hand brake cable when the main arm rotates; the handle is provided with an auxiliary supporting arm, and two ends of the auxiliary supporting arm are rotatably connected to the protective casing and the handle.

5 Claims, 4 Drawing Sheets

(56) References Cited

U.S. PATENT DOCUMENTS

| | | | | |
|---|---|---|---|---|
| 7,527,137 B1 * | 5/2009 | Calendrille, Jr. | ...... | B62K 23/06 |
| | | | | 192/217 |
| 7,779,719 B2 * | 8/2010 | Chiang | ................ | B62M 25/04 |
| | | | | 74/502.2 |
| 7,918,145 B1 * | 4/2011 | Calendrille, Jr. | ...... | G05G 11/00 |
| | | | | 74/502.2 |
| 2002/0035886 A1 * | 3/2002 | Ose | ........................ | B62K 23/02 |
| | | | | 74/502.2 |
| 2007/0199400 A1 * | 8/2007 | Hall | ...................... | B60T 11/046 |
| | | | | 74/502.2 |
| 2019/0375480 A1 * | 12/2019 | Pankratz | ................ | B62K 23/06 |

FOREIGN PATENT DOCUMENTS

| | | | | |
|---|---|---|---|---|
| GB | 21117 | * | 6/1911 | |
| WO | WO 2018068194 A1 * | 4/2018 | ................ | B62L 3/02 |

\* cited by examiner

BRAKE LEVER AND BICYCLE USING THE SAME

CROSS-REFERENCE TO RELATED APPLICATION

This application is a continuation of international application of PCT application No. PCT/CN2020/108959 filed on Aug. 13, 2020, which claims the priority benefit of China application No. 201910796571.3 filed on Aug. 27, 2019. The entirety of each of the above-mentioned patent applications is hereby incorporated by reference herein and made a part of this specification.

BACKGROUND

Technical Field

The present application relates to the field of bicycles, and more particularly, to a brake lever and a bicycle using the same.

Description of Related Art

The currently known child bicycle brake lever generally adopts an adult bicycle brake lever or a scaled-down version of an adult bicycle brake lever. Due to the fact that the hand of a child is small, the child cannot normally use the child bicycle brake lever at a normal start position state. If the start position of the brake lever is adjusted to the position where a child can operate with a small hand, then the brake lever has a short pulling travel of the brake cable, and it is impossible to satisfy a brake that requires a long pulling travel of the brake cable.

For instance, the Chinese utility model patent with the Publication No. CN202609008U discloses a child bicycle brake lever, which adopts the technical solutions that: a bolt abuts against a bar end, and an initial angle of the bar end is adjusted, so that the distance between the bar end and the handlebar is shortened after the bar end rotates by a certain initial angle, and a child can use the bicycle more comfortably.

The above-mentioned existing technical solution has the following defects that, although the operating travel is shortened after a certain initial angle is rotated, the subsequent maximum angle that can be rotated by a bar end is reduced, and therefore, the problem that the brake lever has a short travel and it is impossible to satisfy a brake that requires a long pulling travel of the brake cable remains unresolved.

SUMMARY

It is an object of the present application to provide a brake lever which has the advantage of being able to achieve a sufficient pulling travel of the brake cable with a short operating travel.

In order to achieve the above object, the present application provides the following technical solutions: there is provided a brake lever, which includes a protective casing, a fixing assembly cooperatively fixing the protective casing, a connecting member for connecting a hand brake cable, and a hand brake assembly. The hand brake assembly includes a main arm with one end rotatably connected to the protective casing, and the other end rotatably connected to a handle. The main arm is driven to rotate by applying a force to the handle, the connecting member is driven by a transmission member to move in the direction of tightening the hand brake cable when the main arm rotates. The handle is provided with an auxiliary supporting arm, and two ends of the auxiliary supporting arm are rotatably connected to the protective casing and the handle.

By adopting the above technical solution, the main arm is driven to rotate by applying a force to the handle, the connecting member is driven by a transmission member to move in the direction of tightening the hand brake cable when the main arm rotates, to complete the braking action. Since there are two parts of the main arm and the handle, only the main arm part is much shorter than a force arm of a brake lever in the prior art, and therefore, under the same operating travel, the brake lever according to the present application has a larger rotation angle compared with the brake lever in the prior art, and the larger the rotation angle is, the longer the pulling travel of the brake cable is. The auxiliary supporting arm is rotatably connected to the protective casing and the handle to assist in supporting the handle, so that the handle moves along a determined path. When a hand applies a force to the handle, the handle moves along a rotation path defined by the main arm and the auxiliary supporting arm. Meanwhile, the main arm is rotated by the acting force of the handle, and the transmission member converts the rotation into a linear movement. When the main arm is rotated, the main arm cooperates with the auxiliary supporting arm to keep the handle parallel to the handlebar. Therefore, it is not necessary to reserve rotation space for a traditional brake lever, a short distance gripping distance for facilitating the operation of the child can be achieved, and a sufficiently pulling travel of the brake cable can be achieved with a short operating travel. During rotation, as the handle is rotated close to the handlebar, the angle between the main arm and the auxiliary supporting arm becomes smaller, the force arm of the lever increases, and the required force becomes smaller, so that the braking action can be maintained with the strength of the child's small hands.

Preferably, the transmission member includes a strip-shaped tooth formed on a side surface of the connecting member and a circular arc shaped rack located on the main arm, the strip-shaped tooth is meshed with the circular arc shaped rack, and a circle center of the circular arc shaped rack coincides with rotation center lines of the main arm and the protective casing.

By adopting the above technical solution, the circular arc shaped rack cooperates with the strip-shaped teeth, so that when the main arm rotates, the circular arc shaped rack drives the strip-shaped teeth to move. Since the circle center of the circular arc shaped rack coincides with the rotation center lines of the main arm and the protective casing, during rotation of the main arm, the distance between the circular arc shaped rack and the rotation center does not change, and therefore the circular arc shaped rack and the strip-shaped teeth can always be engaged together.

Preferably, the transmission member includes a force bearing block formed on a side surface of the connecting member and a force applying block moving along with the main arm, and the force applying block abuts against the force bearing block during rotation of the main arm.

By adopting the above technical solution, when the main arm is rotated by cooperating the force applying block with the force bearing block, the force applying block applies a force to the force bearing block, and the force bearing block moves together with the connecting member in the direction of tightening the brake cable.

Preferably, the main arm and the auxiliary supporting arm are arranged parallel to each other, a first hinged point between the main arm and the protective casing, a second hinged point between the main arm and the handle, a third hinged point between the auxiliary supporting arm and the protective casing, and a fourth hinged point between the auxiliary supporting arm and the handle are located at four points of a parallelogram respectively; the handle includes a gripping section, and the gripping section is parallel to a handlebar during rotation of the main arm and the auxiliary supporting arm.

By adopting the above technical solution, four hinged points are arranged at four points of the parallelogram, so that the handle is always maintained in an original orientation state during rotation. Therefore, the gripping section can be always parallel to the handlebar during rotation, and a user feels more comfortable when the hand applies an acting force to the handlebar.

Preferably, the auxiliary supporting arm is located further from the strip-shaped tooth than the main arm.

By adopting the above technical solution, by arranging the auxiliary supporting arm further from the strip-shaped tooth than the main arm, so that the hinged point between the auxiliary supporting arm and the protective casing will not be an obstacle when the main arm is rotated. The main arm is operated to rotate by the handle, and is stopped when the handle abuts against the handlebar, so that a rotation angle of the main arm is as large as possible.

Preferably, the protective casing is provided with a square hole penetrating through two ends, the connecting member includes a column passing through the square hole, the column is formed with a circular groove having a diameter slightly larger than a diameter of a hammer head of the hand brake cable on a side of the column facing side walls of the square hole, a first side groove communicating with the circular groove is formed on the side of the column with the circular groove, a side of the first side groove away from the circular groove penetrates through a side surface of the column, a second side groove is formed on one side of the column facing a port of the square hole, and the second side groove extends from the middle of the column to a position penetrating through a same side of the column.

By adopting the above technical solution, the connecting member is restrained to move only in the direction of the square hole by cooperating the square hole with the column. The hammer head of the hand brake cable passes through the square hole from left to right, and then is embedded into the circular groove after passing out. The hand brake cable finally snaps into the second side groove after passing through the first side groove, so that the hammer head of the hand brake cable cannot be separated from the connecting member. When the connecting member moves, the connecting member can stably drive the hand brake cable to tighten the brake.

Preferably, two guide grooves in a length direction of the square hole are formed on two opposing side walls of the square hole, a same end of the two guide grooves penetrates through the protective casing, the connecting member further includes a cable-pulling toothed bar arranged on a side of the column, and guide blocks snapped into the guide grooves are formed on both sides of the cable-pulling toothed bar.

By adopting the above technical solution, the guide block cooperates with the guide groove to achieve a guiding effect. Meanwhile, since the guide groove penetrates the protective casing only on one side, the guide block only can penetrate into the guide groove from one side and cannot penetrate the guide groove from the other side, and the guide block and the connecting member can be cooperated to achieve a limiting effect.

Preferably, an internal threaded hole is formed at one end of the protective casing; the internal threaded hole is threaded with a brake cable fixing cap, the brake cable fixing cap includes a stud threaded with the inner threaded hole and an operating column connected to a left end of the stud and having a diameter larger than that of the stud; a third groove extending into the stud is formed in an end face of the operating column, and an escape groove communicating with the third groove is formed in the sides of the operating column and the stud.

By adopting the above technical solution, a cable cap of the hand brake cable abuts in the third groove, and the steel wire core penetrates through the brake cable fixing cap through the escape groove, and the position of the cable cap of the hand brake cable can be adjusted by adjusting the position of the brake cable fixing cap, so as to adjust the tightness of the hand brake cable.

Preferably, a first groove with an arc-shaped bottom surface when viewed from a longitudinal section is formed on a lower side of the protective casing, the diameter of the first groove is equal to the diameter of the handlebar and an arc of a groove bottom section is less than 180 degrees; the fixing assembly includes a lower connecting casing located below the protective casing, and a second groove with the same diameter as the first groove is formed on an upper side of the lower connecting casing, the second groove has an arc-shaped bottom surface when viewed from a longitudinal section, with an arc of less than 180 degrees; first connecting projections are formed in the left-right direction along the axis of the first groove, on the front and rear sides of the first groove on the protective casing, first threaded holes penetrating in the up-down direction are formed in each of the first connecting projections, second connecting projections are also formed in the left-right direction along the axis of the second groove, on the front and rear sides of the second groove on lower connecting casing, through holes penetrating in the up-down direction are defined in each of the second connecting projections, and bolts/screws are threaded with the first threaded holes through the through holes.

By adopting the above technical solution, the protective casing and the lower connecting casing are fixed together by threading bolts/screws with the first threaded hole through the through holes, so that the protective casing presses against the handlebar by cooperating the first groove with the second groove, to fix the protective casing to the handlebar.

It is another object of the present application to provide a bicycle using the brake lever described above.

In order to achieve the above object, the present application provides the following technical solutions:

By adopting the above technical solution, the brake lever described above can achieve a sufficient pulling travel of the brake cable with a short operating travel, when a small force is applied, and can tighten the brake cable with a small force, which is suitable for child use.

In summary, the beneficial effects of the present application are as follows:

1. When a hand applies a force to the handle, the handle can smoothly drive the main arm to rotate only when moving along a determined path, a displacement distance that the hand applies a force at a position where the handle is rotatably connected to the main arm is shorter than a displacement distance when the hand grips a brake in the prior art, and under the same force or force saving premise, a sufficient pulling travel of the brake cable can be achieved with a short operating travel, which is suitable for child use.

2. As the handle is rotated close to the handlebar during rotation, the angle between the main arm and the auxiliary supporting arm becomes smaller, the force arm of the lever increases, and the required force becomes smaller, so that the braking action can be maintained with the strength of the child's small hands.

3. By arranging the four hinged points on the four points of the parallelogram, the handle is always maintained in the original orientation state during the rotation, so that the gripping section can be always parallel to the handlebar during rotation, and a user feels more comfortable when the hand applies an acting force to the handlebar.

DESCRIPTION OF THE EMBODIMENTS

Hereinafter, the present application is further illustrated in detail in combination with the accompanying drawings.

Embodiment 1

Figure 1:
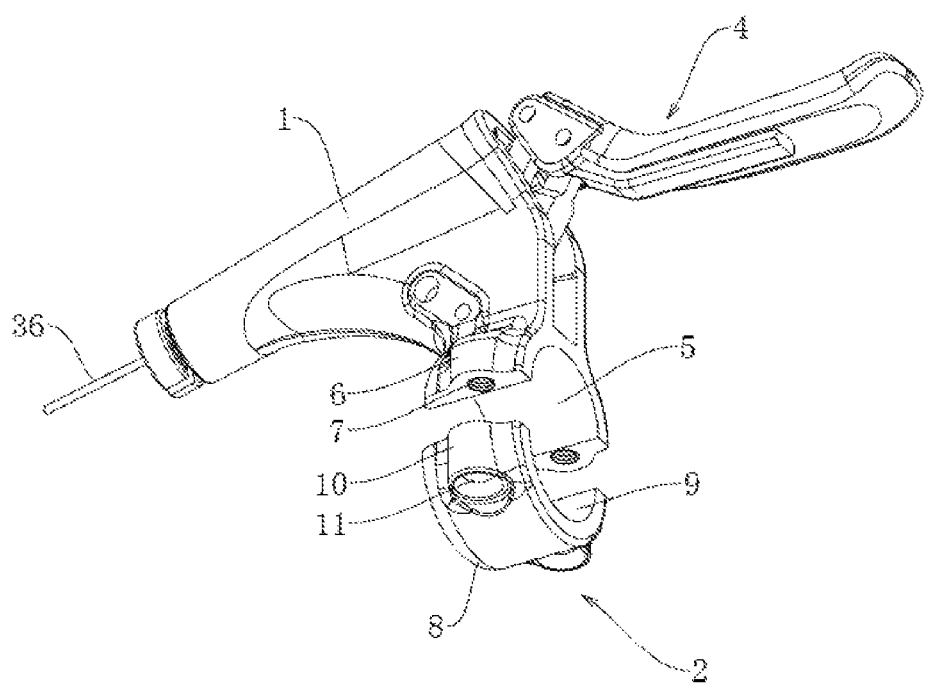
FIG. 1 is a structural schematic diagram of Embodiment 1.
Figure 2:
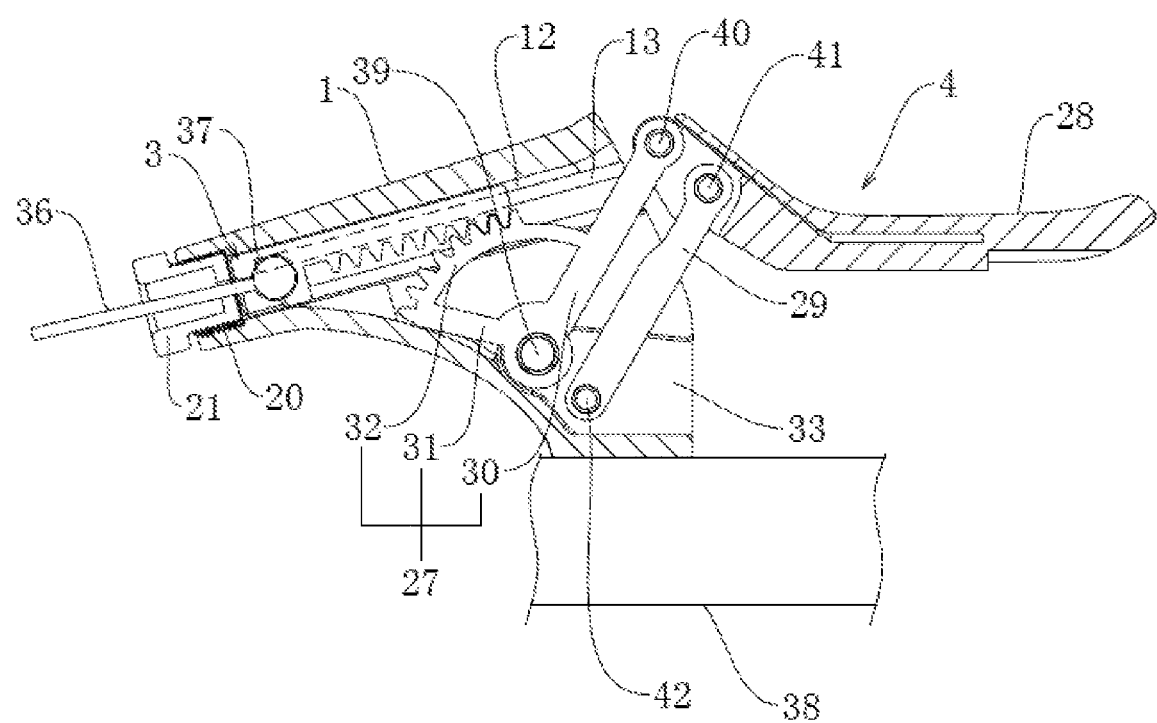
FIG. 2 is a sectional schematic diagram of Embodiment 1.

As shown in FIGS. 1 and 2, there is provided a brake lever, which includes a protective casing 1, a fixing assembly 2 cooperatively fixing the protective casing 1 to a handlebar 38, a connecting member 3 for connecting a hand brake cable 36, and a hand brake assembly 4 for driving the connecting member 3 to move in the direction of tightening the hand brake cable 36. Up, down, left and right of the bicycle brake lever in FIG. 1 are explained as being up, down, left and right throughout the context, and the front surface of the drawing sheet is defined as the front side and the back surface of the drawing sheet is defined as the rear side.

As shown in FIG. 1, a first groove 5 with an arc-shaped bottom surface when viewed from a longitudinal section is formed on the lower side of the protective casing 1, the diameter of the first groove 5 is equal to the diameter of the handlebar 38, and an arc of the groove bottom section is less than 180 degrees. First connecting projections 6 are formed in the left-right direction along the axis of the first groove 5, on the front and rear sides of the first groove 5 on the protective casing 1. First threaded holes 7 penetrating in the up-down direction are formed in each of the first connecting projections 6.

As shown in FIG. 1, the fixing assembly 2 includes a lower connecting casing 8 located below the protective casing 1, and a second groove 9 with the same diameter as the first groove 5 is formed on an upper side of the lower connecting casing 8. The second groove 9 has an arc-shaped bottom surface when viewed from a longitudinal section, with an arc of less than 180 degrees. Second connecting projections 10 are also formed in the left-right direction along the axis of the second groove 9, on the front and rear sides of the second groove 9 on lower connecting casing 8. Through holes 11 penetrating in the up-down direction are formed in each of the second connecting projections 10. The protective casing 1 and the lower connecting casing 8 are arranged on both sides of the handlebar 38, and bolts/screws are threaded with the first threaded holes 7 through the through holes 11 to fix the protective casing 1 to the handlebar 38.

As shown in FIG. 2, a square hole 12 is formed in the upper end portion of the protective casing 1 in the left-right direction, both left and right ends of the square hole 12 penetrate through the protective casing 1, and round corners are chamfered at the four corners of the inner wall of the square hole 12. Guide grooves 13 in the length direction of the square hole 12 are formed on both front and rear side walls of the square hole 12, the guide grooves 13 penetrate through the protective casing 1 on the right side, and a distance is left between the left end of each guide groove 13 and the left end of the protective casing 1. A mounting groove 33 communicating with the square hole 12 is formed on the right side of the protective casing 1, below the square hole 12, and a width of the mounting groove 33 is smaller than that of the square hole 12.

Figure 3:
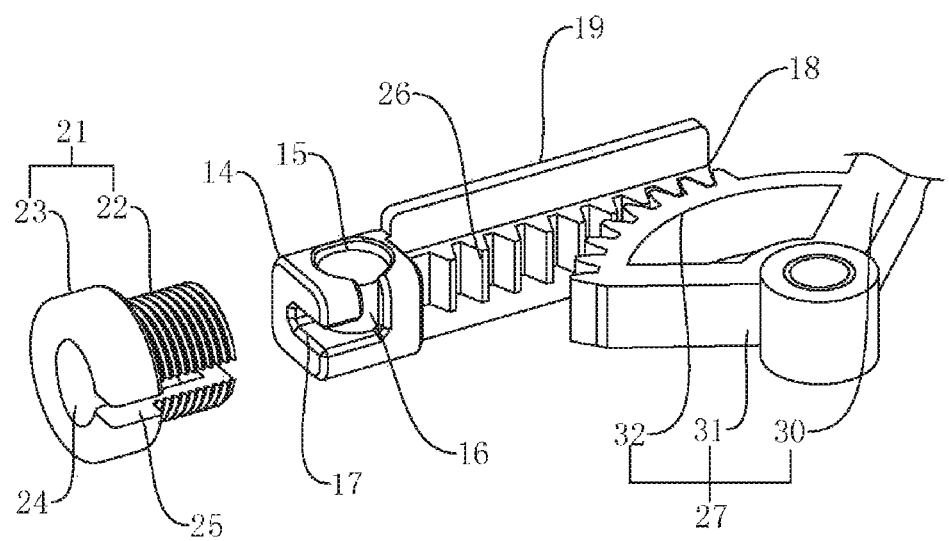
FIG. 3 is a partial structural schematic diagram of a connecting member and a hand brake assembly of Embodiment 1.

As shown in FIGS. 2 and 3, the connecting member 3 includes a column 14 with a cross-sectional shape matched with that of the square hole 12, and a circular groove 15 with a diameter slightly larger than the diameter of the hammer head of the hand brake cable 36 on the front side of the column 14. A first side groove 16 is formed at a front side of the column 14 close to a lower end edge, and a lower end of the first side groove 16 penetrates a lower side wall of the column 14. A second side groove 17 is formed in the middle of the left side surface of the column 14, the second side groove 17 extends from the middle of the left side surface of the column 14 to a position penetrating through the lower side surface of the column 14, and the second side groove 17 communicates with both the circular groove 15 and the first side groove 16. The connecting member 3 further includes a cable-pulling toothed bar 18 formed on the right side of the column 14, and guide blocks 19 snapped into the guide grooves 13 are formed on both front and rear sides of the cable-pulling toothed bar 18. The connecting member 3 can only slide in the direction of the square hole 12 by snap-in of the guide block 19 with the guide groove 13.

As shown in FIGS. 2 and 3, the hammer head of the hand brake cable 36 penetrates through the square hole 12 from left to right, and then the hammer head is embedded in the circular groove 15, and the hand brake cable 36 finally snaps into the second side groove 17. Then, the connecting member 3 penetrates into the square hole 12 and slides along the square hole 12 to a state in which the guide block 19 abuts on the left end surface of the guide groove 13.

As shown in FIGS. 2 and 3, an internal threaded hole 20 is formed at the square hole 12 on the left end of the protective casing 1, and is threaded with a brake cable fixing cap 21 through the internal threaded hole 20. The brake cable fixing cap 21 includes a stud 22 threaded with the inner threaded hole 20 and an operating column 23 connected to the left end of the stud 22, and the diameter of the operating column 23 is larger than that of the stud 22. A third groove 24 extending into the stud 22 is formed in the left end face of the operating column 23, and an escape groove 25 communicating with the third groove 24 is formed in the sides of the operating column 23 and the stud 22. A cable cap of the hand brake cable 36 abuts in the third groove 24, and the steel wire core penetrates through the brake cable fixing cap 21 through the escape groove 25.

As shown in FIGS. 2 and 3, the hand brake assembly 4 includes a strip-shaped tooth 26 formed on the lower side surface of the cable-pulling toothed bar 18, a main transmission arm 27 engaged with the strip-shaped tooth 26, a handle 28 connected to the main transmission arm 27 and an auxiliary supporting arm 29 assisting the handle 28 to operate the main transmission arm 27 to rotate. The main transmission arm 27 includes a main arm 30 rotatably connected to the protective casing 1 in the mounting groove 33, an extension arm 31 integrally formed on a side surface of the main arm 30, and a circular arc shaped rack 32 connected between the extension arm 31 and the main arm 30, and rotation center lines of the main arm 30 and the protective casing 1 are in the front-rear direction. The tooth surface of the circular arc shaped rack 32 faces the strip-shaped teeth 26 and is meshed with the strip-shaped teeth 26, the circle center of the circular arc shaped rack 32 coincides with the rotation center lines of the main arm 30 and the protective casing 1, and in this case, the circular arc shaped rack 32 and the strip-shaped teeth 26 serve as transmission members. One end of the main arm 30 away from the protective casing 1 is rotatably connected to the left end of the handle 28. The auxiliary supporting arm 29 and the main arm 30 are equal in length, the left end of the auxiliary supporting arm 29 is rotatably connected to the protective casing 1, the hinged point is located on the lower right portion of the hinged point of the main arm 30 and the protective casing 1, and the right end of the auxiliary supporting arm 29 is rotatably connected to the handle 28. The main arm 30 and the auxiliary supporting arm 29 are arranged parallel to each other, a first hinged point 39 between the main arm 30 and the protective casing 1, a second hinged point 40 between the main arm 30 and the handle 28, a third hinged point 42 between the auxiliary supporting arm 29 and the protective casing 1, and a fourth hinged point 41 between the auxiliary supporting arm 29 and the handle 28 are located at the four points of a parallelogram respectively. The portion of the handle 28, located on the right side of the hinged point is a gripping section, and the gripping section is always in the left-right direction during rotation of the main arm 30 and the auxiliary supporting arm 29.

Specific Process of Use:

When a downward force is applied to the handle 28, both the main transmission arm 27 and the auxiliary supporting arm 29 rotate in a clockwise direction, and during clockwise rotation of the main transmission arm 27, the circular arc shaped rack 32 drives the cable-pulling toothed bar 18 meshed with the circular arc shaped rack 32 through the strip-shaped teeth 26 to move rightwards, so that a hammer head of the hand brake cable 36 moves rightwards together, and the hand brake cable 36 tightens the brake.

Embodiment 2

Figure 4:
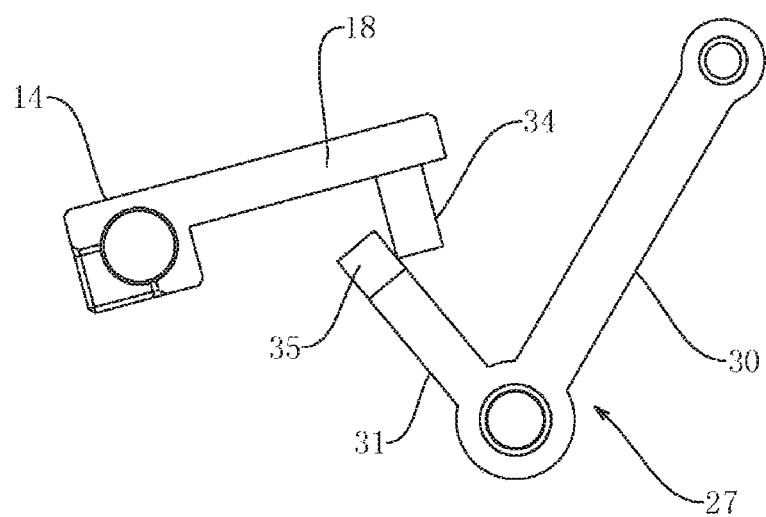
FIG. 4 is a structural schematic diagram of a connecting member cooperating with a main transmission arm of Embodiment 2.

As shown in FIG. 4, there is provided a brake lever, which differs from Embodiment 1 only in that: a force bearing block 34 is formed on the lower end surface of the cable-pulling toothed bar 18, the main transmission arm 27 includes a main arm 30 and an extension arm 31 which are integrally formed, a force applying block 35 is formed on the extension arm 31, and the force applying block 35 abuts against the left side surface of the force bearing block 34.

Embodiment 3

There is provided a bicycle including the brake lever described in Embodiment 1 or Embodiment 2.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A brake lever, comprising a protective casing, a fixing assembly cooperatively fixing the protective casing, a connecting member for connecting a hand brake cable, and a hand brake assembly, wherein, the hand brake assembly comprises a main arm with one end rotatably connected to the protective casing and the other end rotatably connected to a handle; the main arm is driven to rotate by applying a force to the handle, the connecting member is driven by a transmission member to move in the direction of tightening the hand brake cable when the main arm rotates; the handle is provided with an auxiliary supporting arm, and two ends of the auxiliary supporting arm are rotatably connected to the protective casing and the handle, wherein the transmission member comprises a strip-shaped tooth formed on a side surface of the connecting member and a circular arc shaped rack located on the main arm, the strip-shaped tooth is meshed with the circular arc shaped rack, and a circle center of the circular arc shaped rack coincides with rotation center lines of the main arm and the protective casing, wherein the main arm and the auxiliary supporting arm are arranged parallel to each other, a first hinged point between the main arm and the protective casing, a second hinged point between the main arm and the handle, a third hinged point between the auxiliary supporting arm and the protective casing, and a fourth hinged point between the auxiliary supporting arm and the handle are located at four points of a parallelogram respectively; the handle comprises a gripping section, and the gripping section is parallel to a handlebar during rotation of the main arm and the auxiliary supporting arm, wherein the auxiliary supporting arm is located further from the strip-shaped tooth than the main arm, and wherein the protective casing is provided with a square hole penetrating through two ends; the connecting member comprises a column passing through the square hole; the column is formed with a circular groove having a diameter slightly larger than a diameter of a hammer head of the hand brake cable on a side of the column facing side walls of the square hole, a first side groove communicating with the circular groove is formed on the side of the column with the circular groove, a side of the first side groove away from the circular groove penetrates through a side surface of the column, a second side groove is formed on one side of the column facing a port of the square hole, and the second side groove extends from the middle of the column to a position penetrating through a same side of the column.

2. The brake lever according to claim 1, wherein, the transmission member comprises a force bearing block formed on a side surface of the connecting member and a force applying block moving along with the main arm, and the force applying block abuts against the force bearing block during rotation of the main arm.

3. The brake lever according to claim 1, wherein, two guide grooves in a length direction of the square hole are formed on two opposing side walls of the square hole, a same end of the two guide grooves penetrates through the protective casing, the connecting member further comprises a cable-pulling toothed bar arranged on a side of the column, and guide blocks snapped into the guide grooves are formed on both sides of the cable-pulling toothed bar.

4. The brake lever according to claim 3, wherein, an internal threaded hole is formed at one end of the protective casing; the internal threaded hole is threaded with a brake cable fixing cap, the brake cable fixing cap comprises a stud threaded with the inner threaded hole and an operating column connected to a left end of the stud and having a diameter larger than that of the stud; a third groove extending into the stud is formed in an end face of the operating column, and an escape groove communicating with the third groove is formed in the sides of the operating column and the stud.

5. The brake lever according to claim 1, wherein, a first groove with an arc-shaped bottom surface when viewed from a longitudinal section is formed on a lower side of the protective casing, the diameter of the first groove is equal to the diameter of the handlebar and an arc of a groove bottom section is less than 180 degrees; the fixing assembly comprises a lower connecting casing located below the protective casing, and a second groove with the same diameter as the first groove is formed on an upper side of the lower connecting casing, the second groove has an arc-shaped bottom surface when viewed from a longitudinal section, with an arc of less than 180 degrees; first connecting projections are formed in the left-right direction along the axis of the first groove, on the front and rear sides of the first groove on the protective casing, first threaded holes penetrating in the up-down direction are formed in each of the first connecting projections, second connecting projections are also formed in the left-right direction along the axis of the second groove, on the front and rear sides of the second groove on lower connecting casing, through holes penetrating in the up-down direction are formed in each of the second connecting projections, and bolts/screws are threaded with the first threaded holes through the through holes.

* * * * *